United States Patent
Li et al.

(10) Patent No.: US 12,271,329 B2
(45) Date of Patent: Apr. 8, 2025

(54) MULTI-PORT MEMORY LINK EXPANDER TO SHARE DATA AMONG HOSTS

(71) Applicant: Intel Corporation, Santa Clara, CA (US)

(72) Inventors: Zhuangzhi Li, Shanghai (CN); Jie Bai, Shanghai (CN); Di Zhang, Shanghai (CN); Changcheng Liu, Shanghai (CN); Zhonghua Sun, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 18/250,325

(22) PCT Filed: Nov. 24, 2020

(86) PCT No.: PCT/CN2020/131066
§ 371 (c)(1),
(2) Date: Apr. 24, 2023

(87) PCT Pub. No.: WO2022/109770
PCT Pub. Date: Jun. 2, 2022

(65) Prior Publication Data
US 2023/0385220 A1    Nov. 30, 2023

(51) Int. Cl.
*G06F 13/40* (2006.01)
*G06F 13/16* (2006.01)
*G06F 13/42* (2006.01)

(52) U.S. Cl.
CPC ...... *G06F 13/4022* (2013.01); *G06F 13/1663* (2013.01); *G06F 13/4081* (2013.01); *G06F 13/4221* (2013.01)

(58) Field of Classification Search
CPC ............. G06F 13/4022; G06F 13/1663; G06F 13/4081; G06F 13/4221
See application file for complete search history.

(56) References Cited

U.S. PATENT DOCUMENTS

| | | | |
|---|---|---|---|
| 2005/0149314 A1* | 7/2005 | Looi | G06F 13/16 703/25 |
| 2016/0034185 A1* | 2/2016 | Simionescu | G06F 3/061 710/74 |

(Continued)

FOREIGN PATENT DOCUMENTS

| | | |
|---|---|---|
| CN | 1549973 A | 11/2004 |
| EP | 1912115 A1 | 4/2008 |

OTHER PUBLICATIONS

International Search Report and Written Opinion for PCT/CN2020/131066 mailed Aug. 23, 2021.

*Primary Examiner* — Henry Tsai
*Assistant Examiner* — John B Roche
(74) *Attorney, Agent, or Firm* — Jordan IP Law, LLC

(57) ABSTRACT

Systems, apparatuses and methods may provide for technology that collects, by a BIOS (basic input output system), memory information from a first host path to a coherent device memory on a memory expander, wherein the memory expander includes a plurality of host paths, transfers the memory information from the BIOS to an OS (operating system) via one or more OS interface tables, and initializes, by the OS, the memory expander based on the memory information, wherein the memory information includes memory capabilities and configuration settings associated with the memory expander.

23 Claims, 11 Drawing Sheets

(56) References Cited

U.S. PATENT DOCUMENTS

| | | | |
|---|---|---|---|
| 2019/0243637 A1* | 8/2019 | Nachimuthu | G06F 8/656 |
| 2019/0305888 A1* | 10/2019 | Das Sharma | H04L 1/0071 |
| 2020/0019323 A1* | 1/2020 | Zagade | G06F 3/0653 |
| 2020/0117625 A1* | 4/2020 | Browne | G06F 11/0724 |
| 2020/0125503 A1* | 4/2020 | Graniello | G06F 15/7807 |
| 2020/0192832 A1 | 6/2020 | Regupathy et al. | |
| 2021/0011864 A1* | 1/2021 | Guim Bernat | G06F 12/0833 |
| 2021/0064114 A1* | 3/2021 | Troia | G06F 1/3225 |
| 2021/0286752 A1* | 9/2021 | Modukuri | G06F 13/4022 |

* cited by examiner

MULTI-PORT MEMORY LINK EXPANDER TO SHARE DATA AMONG HOSTS

CROSS REFERENCE TO RELATED APPLICATIONS

The present application is a U.S. National Phase Patent Application, which claims the benefit of priority to International Patent Application No. PCT/CN2020/131066 filed on Nov. 24, 2020.

TECHNICAL FIELD

Embodiments generally relate to memory links. More particularly, embodiments relate to a multi-port memory link expander to share data among hosts.

BACKGROUND

Data sharing may be useful for communications among host devices in cloud or edge usage scenarios, particularly when failover or a system update problem is encountered in a dual-host architecture. Conventional solutions, which may involve copying data between host devices over a non-transparent bridge (NTB, e.g., point-to-point bus implemented via a Peripheral Component Interconnect Express/PCIe input/output path) that is operated as a direct data link, typically have limited performance resulting from copying data into local memory of the host devices.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Embodiments improve the latency and bandwidth of sharing data between multiple host devices in edge computing environments, which helps maintain a high availability of service. The technology described herein provides a memory expander with multiple ports based on memory link technology such as, for example, COMPUTE EXPRESS LINK (CXL) technology. Embodiments use the memory expander to make full capability of memory technologies such as, for example, data center persistent memory modules (DCPMMs). Accordingly, embodiments enrich the application scenarios of CXL and DCPMM.

Figure 1:
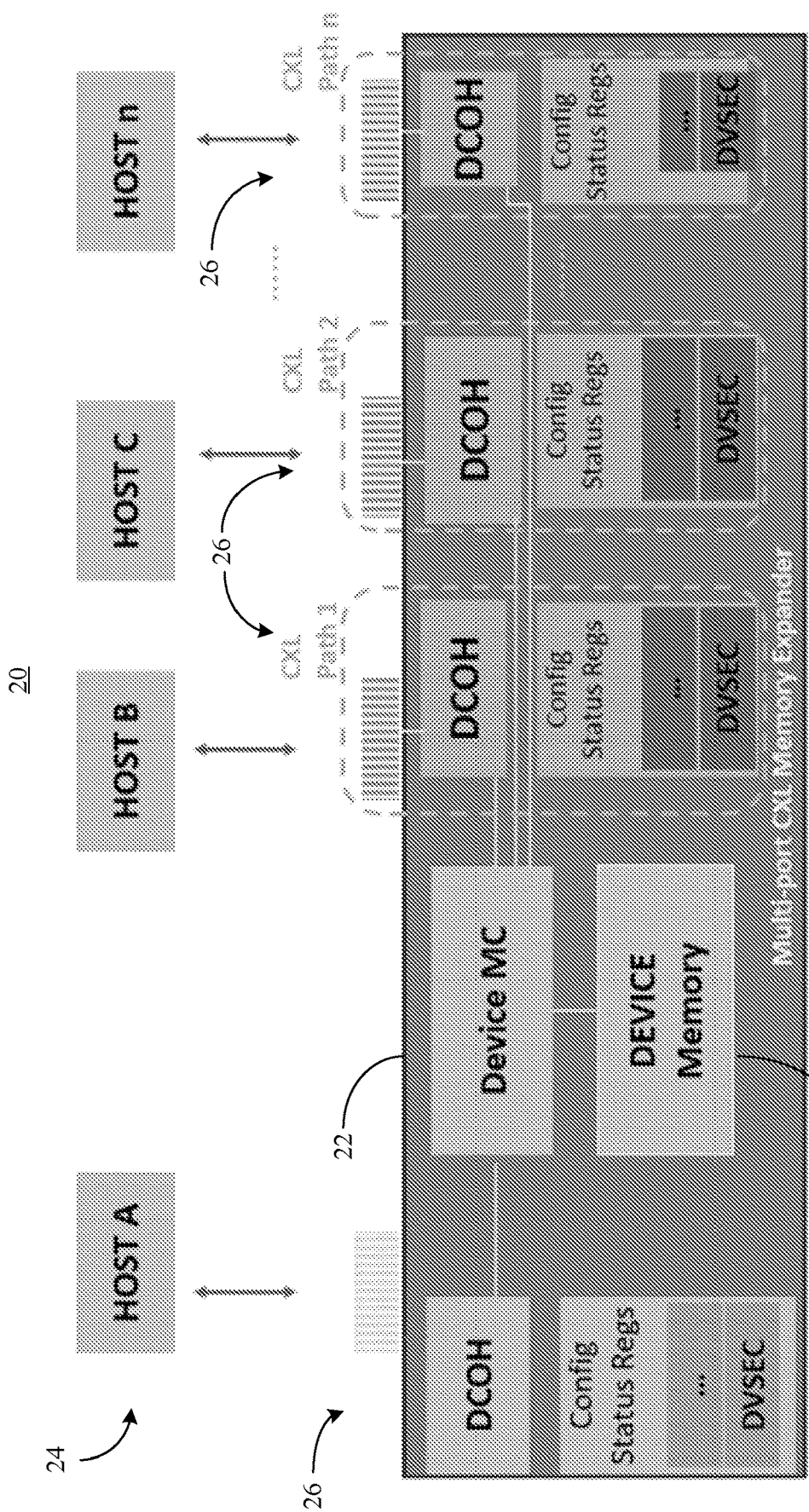
FIG. 1 is a block diagram of an example of a performance-enhanced computing system according to an embodiment.

Turning now to FIG. 1, a performance-enhanced computing system 20 is shown in which a multi-port CXL memory expander (MCME) 22 shares data among a plurality of hosts 24 (e.g., host devices). In an embodiment, the memory expander 22 includes a physical card with multiple sets of CXL paths 26 (e.g., host paths). In the illustrated example, each path 26 includes a CXL port, a device coherent agent (DCOH), and a set of registers (e.g., configuration, status and/or designated vendor-specific extended capability/DVSEC registers). Each isolated CXL path 26 may connect to one host 24, which confirms each physical link servicing relative to the host 24 independently. Relative registers expose memory capability and provide configuration process information along with CXL protocols, which enables the hosts 24 to reserve the accurate address space for the same physical space in a coherent device memory 28 of the memory expander 22. Thus, the memory expander 22 may report address mapping information to the hosts 24.

In addition to the memory expander 22, embodiments enable the hosts 24 to initialize the memory expander 22 and access the coherent device memory 28. All hosts 24 locate the memory expander 22 by BIOS and expose the coherent device memory 28 to an upper OS. In an embodiment, the hosts 24 obtain access rights by negotiating with one another (e.g., via a token and/or keep alive communications) to use the memory expander 22 in different time slots (e.g., controlled by flexible software).

As the CXL Specification (e.g., Rev. 1.1) defines, cacheable and coherent memory is supported. Host processors (e.g., central processing units/CPUs) in the hosts 24 may cache data lines from the memory 28 of the memory expander 22 similarly to DRAM (dynamic random access memory, e.g., system memory), which substantially enhances performance. The illustrated memory expander 22 provides the OS in each host 24 with cacheable memory, and no copying of data (e.g., zero-copy). In an embodiment, the memory expander 22 sets an isolated link for each host 24 and maps the coherent device memory 28 into the system addresses of the hosts 24 (e.g., similar to DRAM) in an initialization stage, as will be discussed in greater detail. Additionally, the CPU on one host 24 could obtain privileges to access data from the coherent device memory 28 directly and without copying. In an embodiment, the memory expander 22 uses reserved standard register values (see Table I) to expose the coherent device memory 28 to the different hosts 24 by a flexible software procedure that is easily implemented and deployed in various scenarios.

Figure 2:
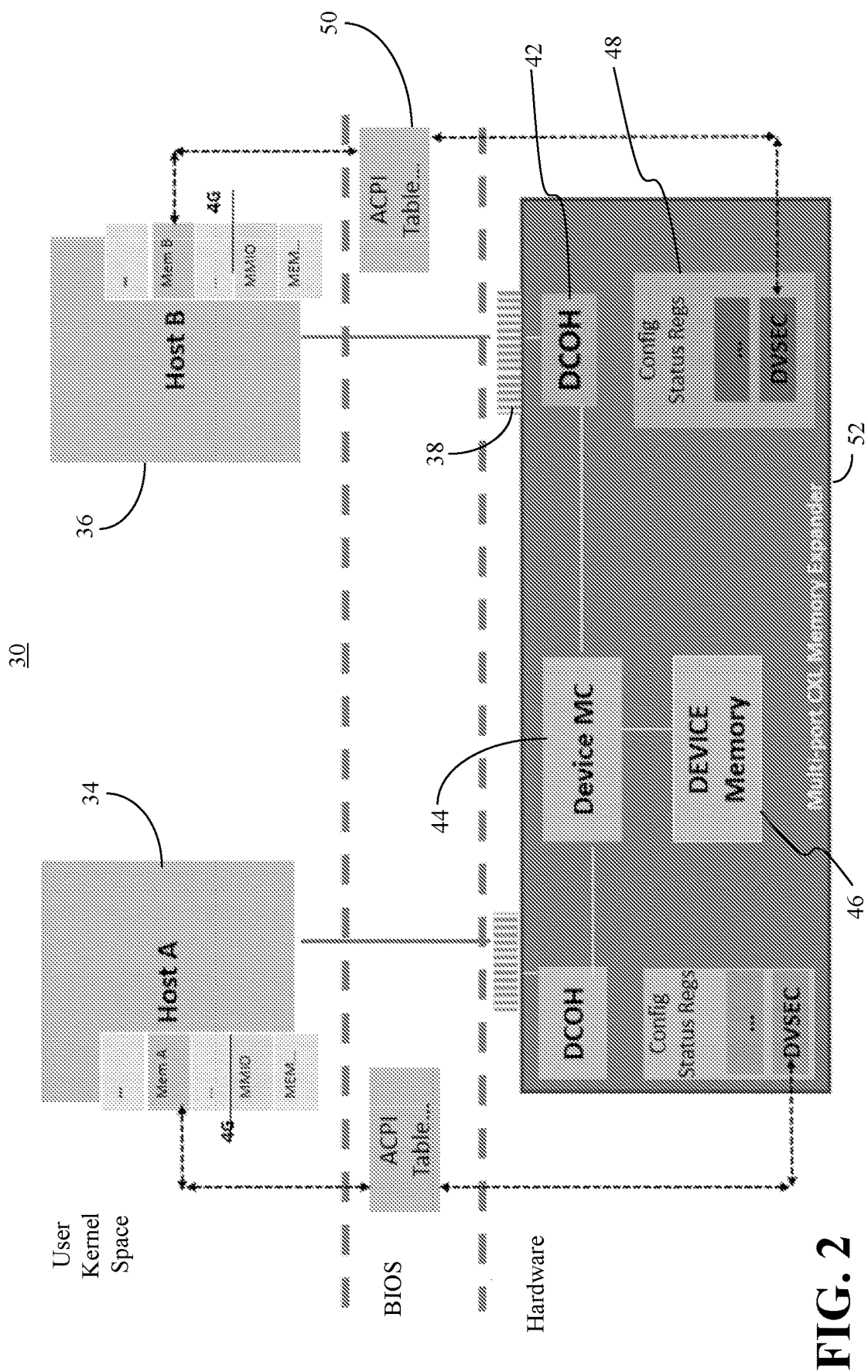
FIG. 2 is a block diagram of an example of a memory expander architecture according to an embodiment.

FIG. 2 shows an architecture 30 in which a memory expander 52 (e.g., MCME) enables data sharing between a first host ("Host A") 34 and a second host 36 ("Host B"). Although two hosts 34, 36 are shown to facilitate discussion, the number of hosts may be greater than two. In an embodiment, a CXL port 38 includes a standard CXL physical layer (PHY), data layer, and transaction layer. The port 38 may provide a CXL data/configuration path between the second host device 36 and the memory expander 52 in accordance with the CXL protocol. Additionally, a DCOH 42 may interpret and forward CXL memory protocol information to a device memory controller MC (Memory Controller) 44. In an embodiment, the MC 44 is responsible for accessing a coherent device memory 46 (e.g., as defined in a CXL Specification). Configuration and status registers 48 may have common attributes following a CXL Specification and implement enumeration and configuration procedures. In an embodiment, the registers 48 include DVSEC registers that report CXL memory capability and provide configuration information. Table I below shows two additional features of the DVSEC registers.

TABLE I

| Register | bit | value | Description |
| --- | --- | --- | --- |
| DVSEC Flex Bus Range* Size Low/High: Memory_Active | 1 | 1 or 0 | Once Memory_Active is "1", any subsequent accesses to the memory (HDM/Host-managed Device Memory) range are decoded and routed to the local memory by the device. MCME vendors may confirm that only one set of Memory_Active.bit1 effective. If one has value as "1", other CXL Path's Memory_Active.bit1 will be cleared to "0". |
| DVSEC Flex Bus Range* Size Low/High: Memory_Class | 4:2 | 100 | Memory_Class: Indicates the class of memory 000 - Memory Class (e.g., normal DRAM); 001 - Storage Class (e.g., Intel 3D XPoint)); Reserved value 100 is expanded as MCME memory with Memory Class attributes; |

Extending OS Interface Tables for MCME

BIOS will obtain capability information for the memory expander 52 and expose new memory expander 52 information to an OS by extending attributes in an OS interface table such as, for example a heterogeneous memory attribute (HMAT) Advance Configuration and Power Interface (ACPI) table 50. The extended attributes are shown in Table II below.

TABLE II

| ACPI table | value | Description |
| --- | --- | --- |
| HMAT.Creator ID | "MCME" | Expand new value to indicate MCME device for OS. |
| MAT.Flags.Enabled | 1 | Fill "1" to indicate following attribute of hot plugging; |
| MAT.Flags.Hot_Pluggable | 1 | Fill "1" to expose attribute to OS, OS will treat this new memory node as hot pluggable handling; |

ACPI may also add APIs (application programming interfaces) for setting features used by OS into memory expander 52.

Handles for MCME in OS

The LINUX OS may be used as an example to illustrate the handles for the memory expander 52. LINUX enables attributes such as, for example, MEMORY_HOTREMOVE and HAVE_BOOTMEM_INFO_NODE in the OS. The LINUX OS adds a node type ZONE_MOVABLE_MCME based on ZONE_MOVABLE, and adds the function Sparse_MCME_memory to parse MCME memory.

Both hosts 34, 36 connected to the memory expander 52 may enumerate the memory expander 52 via an isolated CXL path and determine the capabilities of the memory expander 52. Each OS may initially keep the memory expander 52 "offline". The OS of the hosts 34, 36 may confirm usage ownership of the memory expander 52 exclusively by keep alive communications or other suitable technology (e.g., ORACLE Access Manager/OAM) to quit or handover ownership to one another. With defined metadata confirmed by upper software, a new owner may efficiently reuse data in the memory expander 52.

Figure 3:
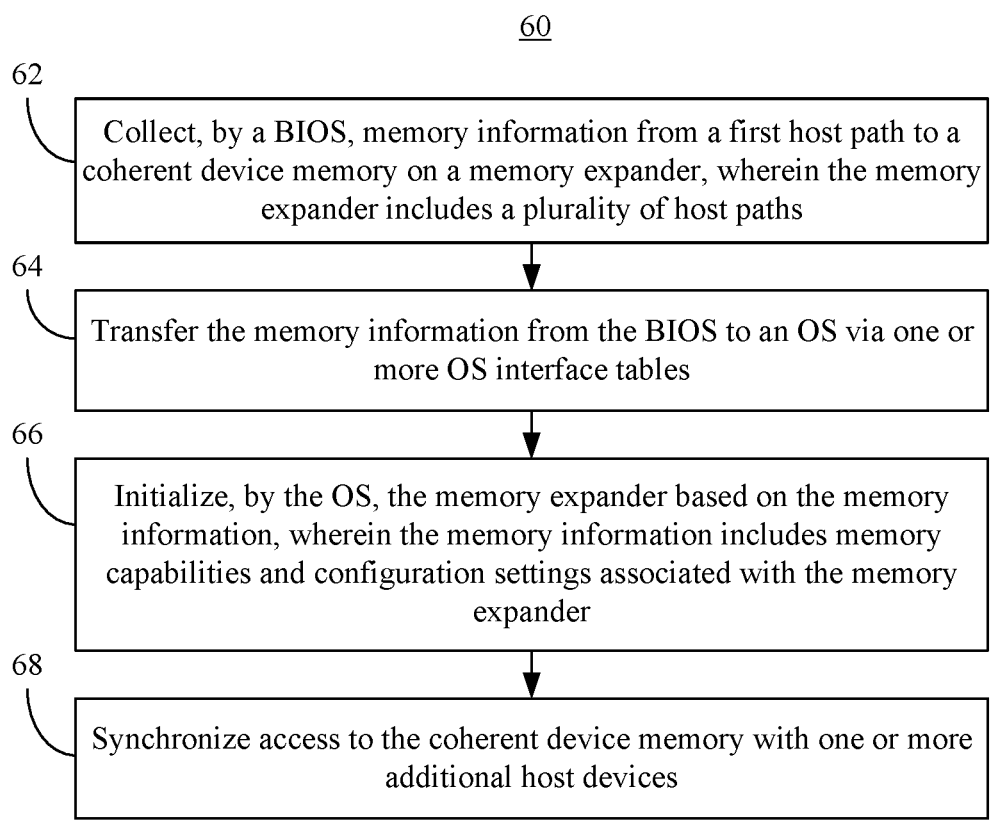
FIG. 3 is a flowchart of an example of a method of operating a performance-enhanced computing system according to an embodiment.

FIG. 3 shows a method 60 of operating a performance-enhanced computing system. The method 60 may generally be implemented by a host device such as, for example, the one or more of the hosts 24 (FIG. 1) and/or the hosts 34, 36 (FIG. 2), already discussed. More particularly, the method 60 may be implemented as one or more modules in a set of logic instructions stored in a machine- or computer-readable storage medium such as RAM, read only memory (ROM), programmable ROM (PROM), firmware, flash memory, etc., in configurable logic such as, for example, programmable logic arrays (PLAs), field-programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 provides for collecting, by a BIOS, memory information from a first host path to a coherent device memory on a memory expander, wherein the memory expander includes a plurality of host paths. In one example, the coherent device memory is hot-pluggable memory that complies with a COMPUTE EXPRESS LINK standard. Block 64 may transfer the memory information from the BIOS to an OS via one or more OS interface tables (e.g., HMAT). In an embodiment, block 66 initializes, by the OS, the memory expander based on the memory information, wherein the memory information includes memory capabilities and configuration settings associated with the memory expander.

Block 68 provides for synchronizing access to the coherent device memory with one or more additional host devices.

As will be discussed in greater detail, access to the coherent device memory may be synchronized via a token and/or one or more keep alive communications. Moreover, block 68 may bypass a copy (e.g., zero-copy) of data from the coherent device memory to the host device.

Figure 4:
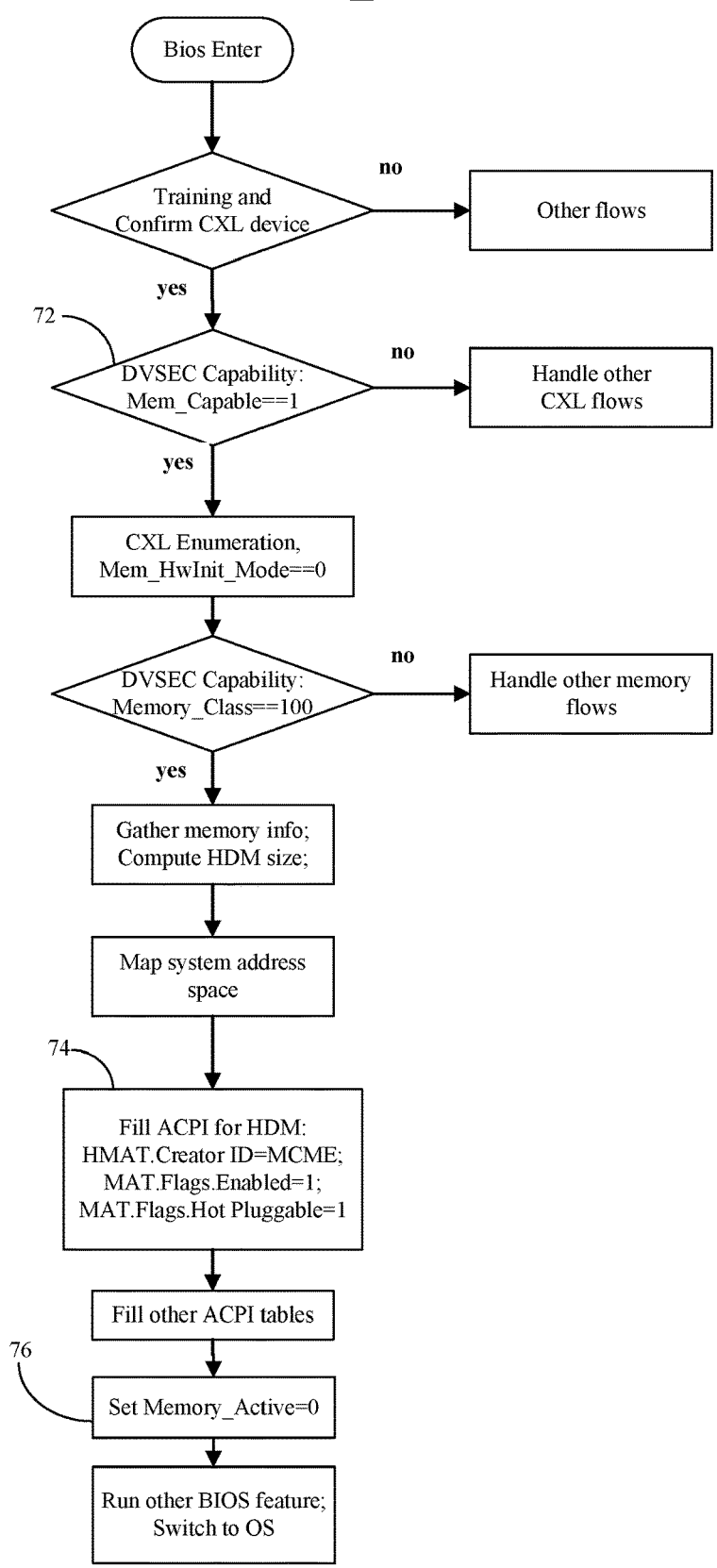
FIG. 4 is a flowchart of an example of a method of initializing a memory expander in a basic input output system (BIOS) according to an embodiment.

FIG. 4 shows a method 70 of initializing a memory expander in BIOS. The method 70 may generally be implemented by a host device such as, for example, the one or more of the hosts 24 (FIG. 1) and/or the hosts 34, 36 (FIG. 2), already discussed. More particularly, the method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Initialization of MCME and Switching owner of MCME
Initialization of MCME
Operation 1—Initialization of MCME in BIOS
  a. The host enters BIOS and triggers training. If the physical link supports CXL, BIOS will check CXL DVSEC to further determine the CXL capabilities;
  b. The host obtains Mem_Capable from DEVSEC. In one example, the MCME vendor hard-codes this value as "1", indicating that memory capacity supported;
  c. The host obtains Mem_HwInit_Mode as 0 from DEVSEC. Note that this value indicates the device will not initialize memory itself;
  d. In block 72, the host gets Memory_Class. Although only two types are defined in the CXL standard, embodiments expand the value "100" as MCME memory;
  e. BIOS obtains the memory size, maps the memory into the system address space, and then sets MEM Bar with the address range;
  f. In block 74, BIOS collects information and reports the collected information to the OS via one or more ACPI tables. For HMAT(heterogenous memory attribute table) and MAT (memory affinity table), "MAT.Flags.Enabled" are set as "1", "MAT.Flags.Hot Pluggable" will be "1", these indicate that OS could treat this memory as ZONE_MOVABLE_MCME based on hot-plug; with additional "HMAT.creator ID" set as a new value indicating "MCME", accordingly, the MCME and OS may modify "ZONE_MOVABLE_MCME memory" to online without triggering an interrupt caused by a physical hot-plug;
  g. In block 76, BIOS sets Memory_Active as "0", disables accessing MCME memory and waits for OS to enable the path.

Figure 5:
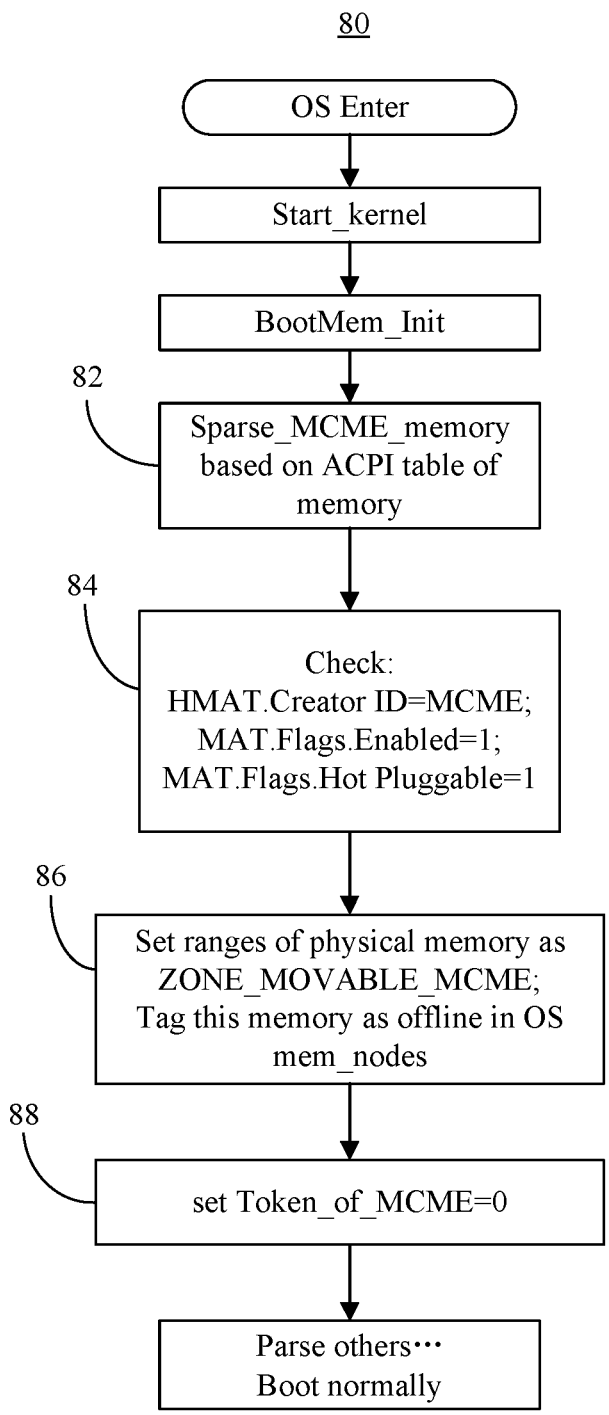
FIG. 5 is a flowchart of an example of a method of initializing a memory expander in an operating system (OS) according to an embodiment.

FIG. 5 shows a method 80 of initializing a memory expander in OS. The method may generally be implemented by a host device such as, for example, the one or more of the hosts 24 (FIG. 1) and/or the hosts 34, 36 (FIG. 2), already discussed. More particularly, the method 80 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Operation 2—Initialization of MCME in OS
  a. In block 82, the host enters OS and starts up. In an earlier phase, the host parses ACPI table and obtains attributes of the MCME memory;
  b. Based on collected info from HMAT/MAT, the OS identifies MCME memory nodes at block 84, sets nodes as ZONE_MOVABLE_MCME, and tags the nodes as offline at block 86;
  c. The OS boots further to normal state, and sets Token_of_MCME as 0 at block 88, to indicate that there is no usage right for MCME memory.

Figures 6A, 6B:
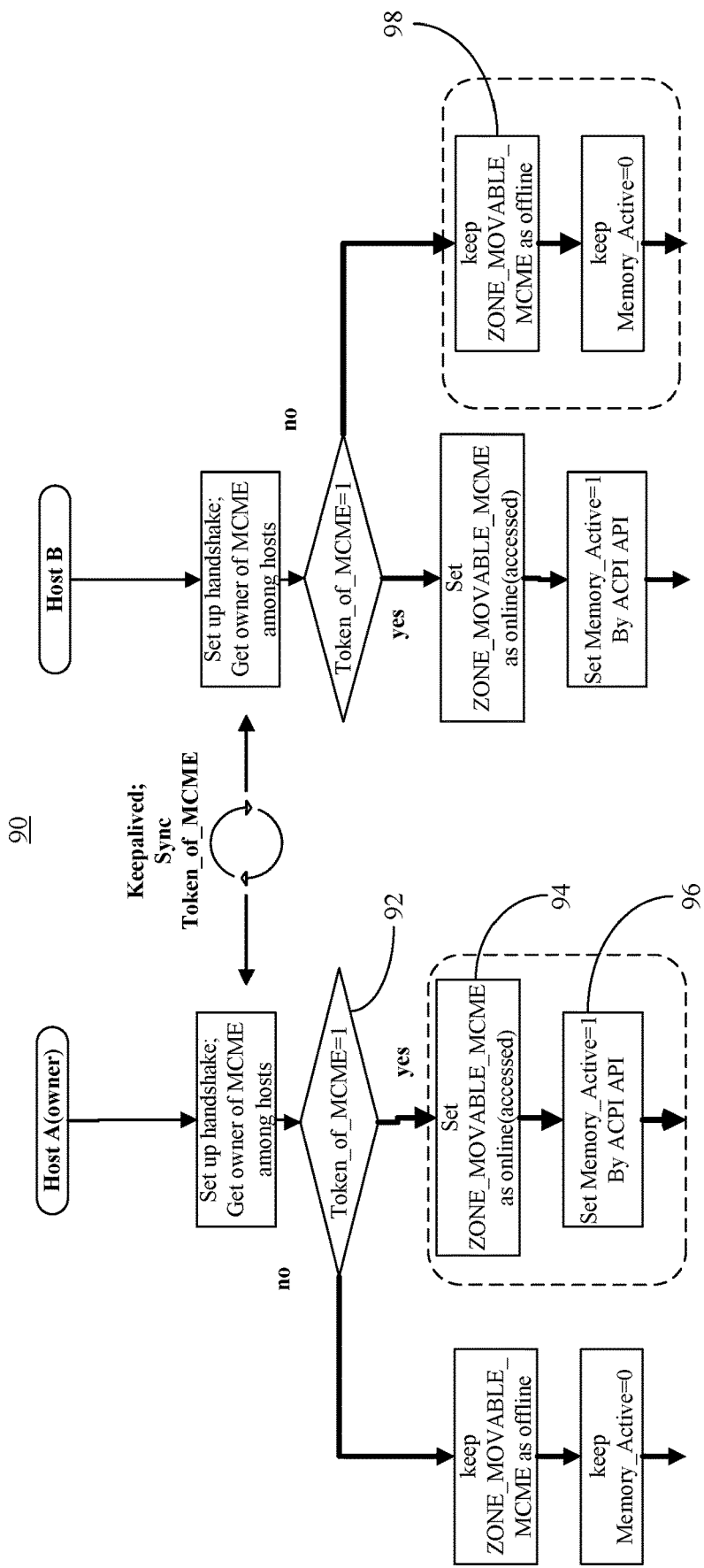
FIGS. 6A and 6B are flowcharts of an example of a method of acquiring usage rights of a memory expander according to an embodiment.

Operation 3—Assign MCME for one Host
FIGS. 6A and 6B shows a method 90 of acquiring usage rights. The method 90 may generally be implemented by a host device such as, for example, the one or more of the hosts 24 (FIG. 1) and/or the hosts 34, 36 (FIG. 2), already discussed. More particularly, the method 90 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Hosts may sync mutually and set up keep alive communications based on existing policies. The hosts may assign an owner of MCME to one host (e.g., Host A) flexibly.
  a. In block 92, Host A obtains ownership of MCME and sets the flag Token_of_MCME as "1";
  b. In the owner flow, Host A sets memory nodes of MCME as "online" at block 94 and sets Memory_Active to "1" in MCME at block 96 to indicate that physical memory may be accessed by Host A;
  c. In the non-owner flow, Host B keeps memory nodes of MCME as "offline" at block 98 until Host B is re-assigned as owner of MCME.

Figure 7:
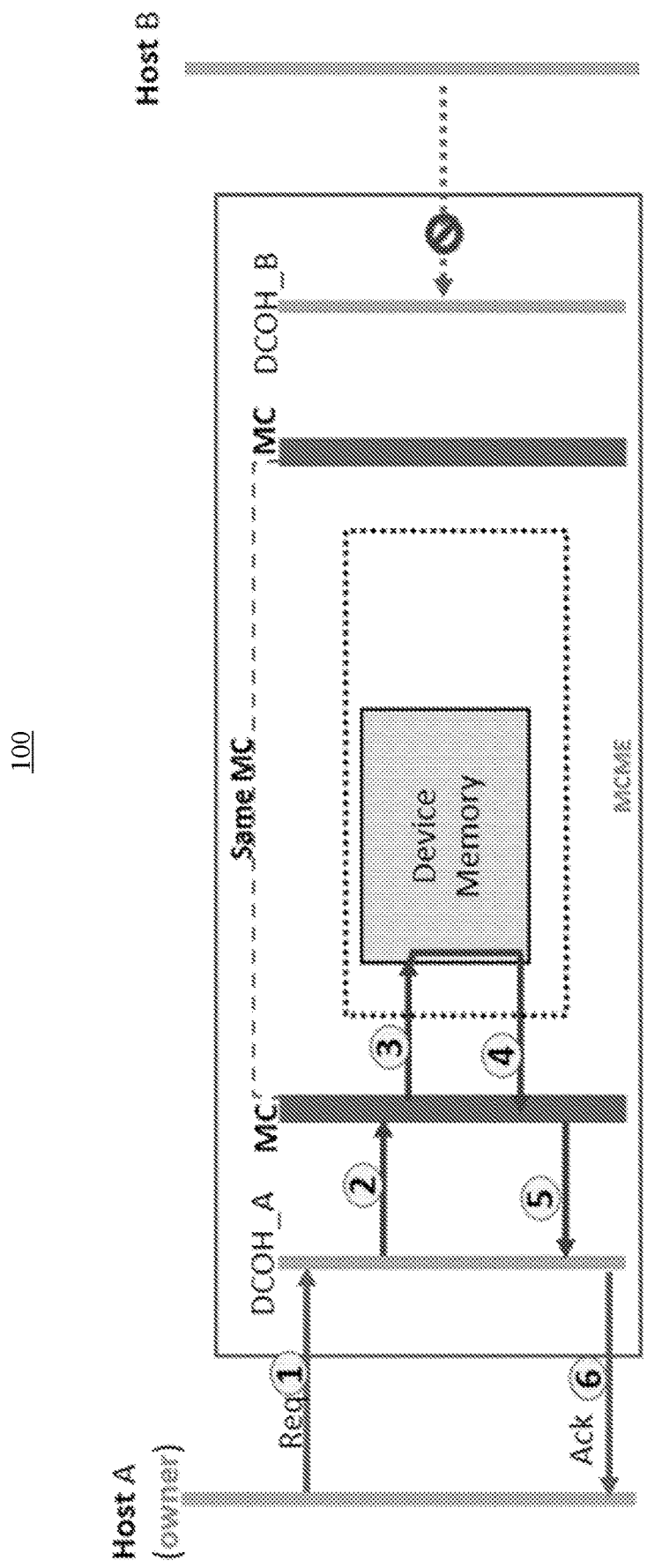
FIG. 7 is a block diagram of an example of a host data flow according to an embodiment.

FIG. 7 shows a host data flow 100 according to an embodiment. In the illustrated example, Host A accesses memory attached in MCME. Requests will be triggered from Host A and reach DCOH_A by a CXL link. The DCOH will interpret/convert the semantics into an internal request for the CXL memory device and forward the request to the MC to access the coherent device memory.

Figure 8:
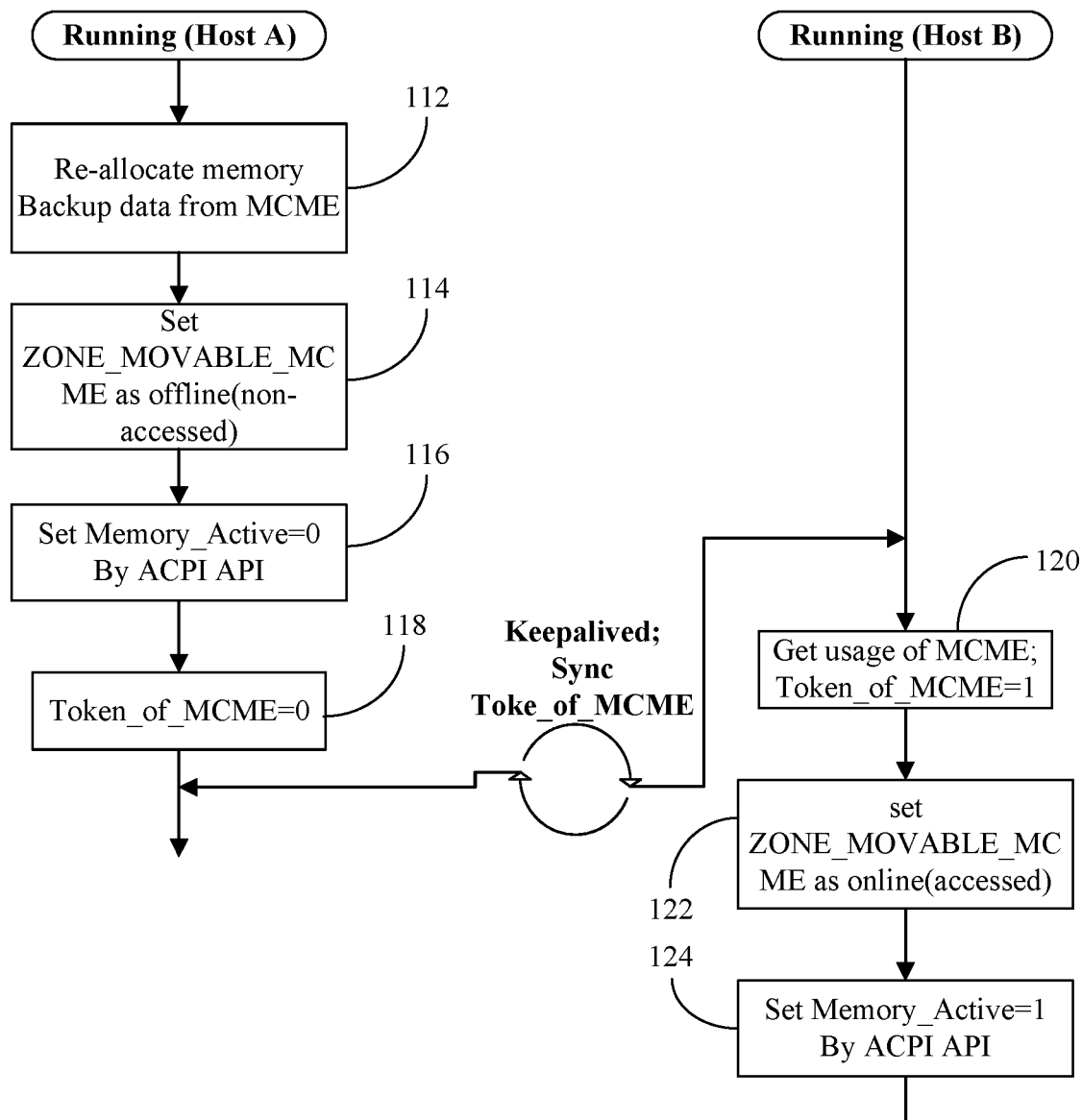
FIG. 8 is a flowchart of an example of a host switch flow according to an embodiment.

FIG. 8 shows a method 110 of a conducting a host switch. The method 110 may generally be implemented by a host device such as, for example, the one or more of the hosts 24 (FIG. 1) and/or the hosts 34, 36 (FIG. 2), already discussed. More particularly, the method 110 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Switching Owner of MCME
Switch Owner to Share MCME Memory
Hosts may sync mutually and re-assign an owner of the MCME. With meta-data, the new owner may reuse data shared in the MCME. In the illustrated example, to quit the Token_of_MCME, Host A re-allocates memory in itself at block 112 to move data from MCME to a remote backend as backup data. Then, Host A sets the nodes of the MCME memory as "offline" at block 114, sets Memory_Active "0" at block 116 to close the read/write path in MCME, and notifies Host B at block 118. Host B will take over as owner of the MCME at block 120, set Token_of_MCME as "1" at block 122, and enable the path to be accessed at block 124.

Figure 9:
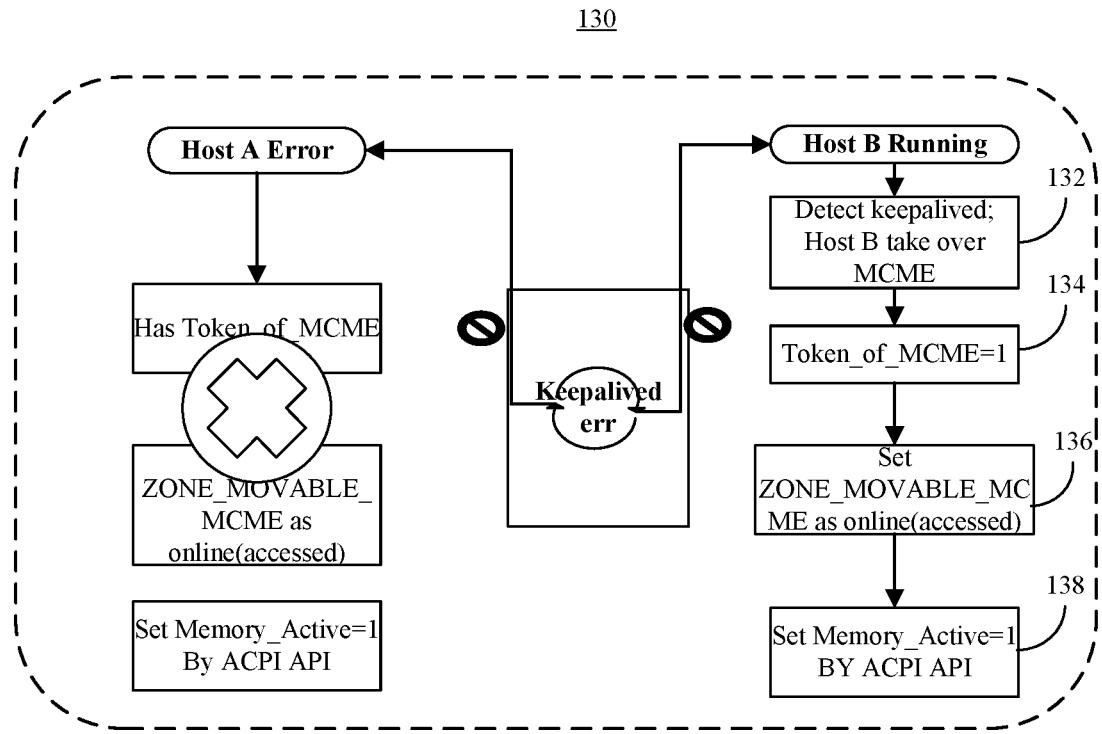
FIG. 9 is a flowchart of an example of a host switch flow in response to an error according to an embodiment.

FIG. 9 shows a method 130 of conducting a host switch in response to an error. The method 130 may generally be implemented by a host device such as, for example, the one or more of the hosts 24 (FIG. 1) and/or the hosts 34, 36 (FIG. 2), already discussed. More particularly, the method 130 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

New Host Taking Over Owner of MCME

When Host B detects that Host A has crashed at block 132, Host B will take over ownership of the MCME and set Token_of_MCME as "1" at block 134. Host B enables memory nodes in OS as "online" at block 136. Finally, Host B will set Memory_Active "1" in MCME at block 138 to open the read/write path. Meanwhile, the MCME will clear Memory_Active for Host A to disable the access path. If the error in host A recovers, Host A may be re-assigned as owner of MCME if appropriate.

Figure 10:
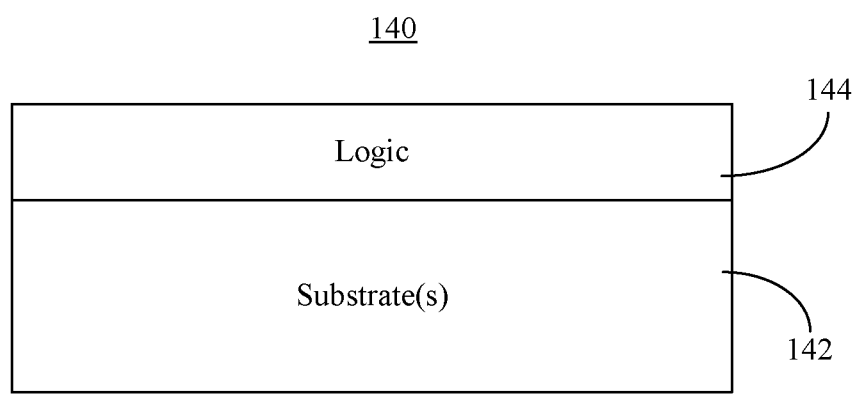
FIG. 10 is an illustration of an example of a semiconductor package apparatus according to an embodiment.

FIG. 10 shows a semiconductor apparatus 140 (e.g., host processor chip and/or package). The illustrated apparatus 140 includes one or more substrates 142 (e.g., silicon, sapphire, gallium arsenide) and logic 144 (e.g., transistor array and other integrated circuit/IC components) coupled to the substrate(s) 142. In an embodiment, the logic 144 implements one or more aspects of the method 60 (FIG. 3), the method (FIG. 4), the method 80 (FIG. 5), the method 90 (FIGS. 6A and 6B), the method 110 (FIG. 8) and/or the method 130 (FIG. 9), already discussed. Thus, the logic 144 may collect, by a BIOS, memory information from a first host path to a coherent device memory on a memory expander, wherein the memory expander includes a plurality of host paths, transfer the memory information from the BIOS to an OS via one or more OS interface tables, and initialize, by the OS, the memory expander based on the memory information, wherein the memory information includes memory capabilities and configuration settings associated with the memory expander.

The logic 144 may be implemented at least partly in configurable logic or fixed-functionality hardware logic. In one example, the logic 144 includes transistor channel regions that are positioned (e.g., embedded) within the substrate(s) 142. Thus, the interface between the logic 144 and the substrate(s) 142 may not be an abrupt junction. The logic 144 may also be considered to include an epitaxial layer that is grown on an initial wafer of the substrate(s) 142.

Figure 11:
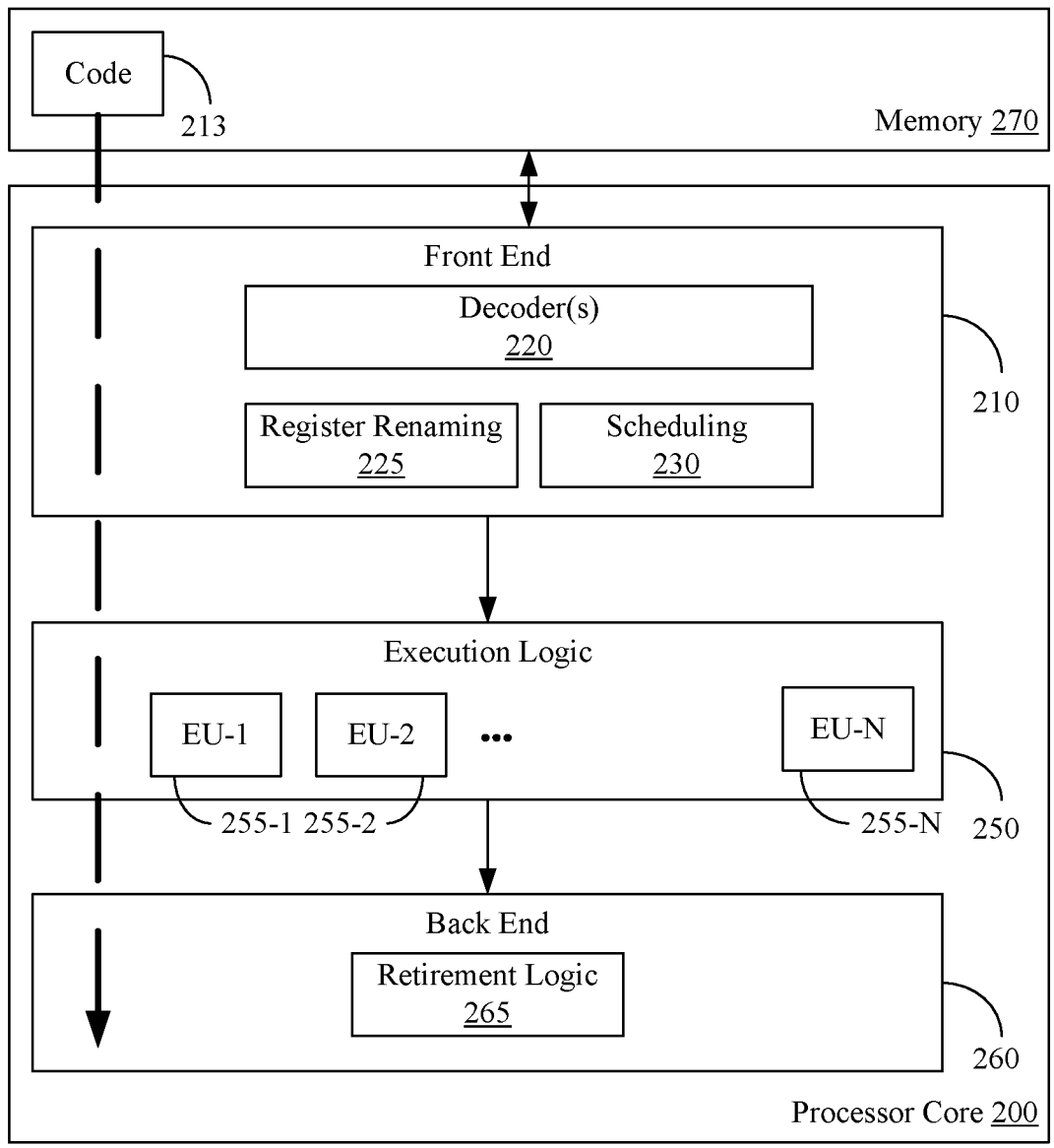
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 60 (FIG. 3), the method 70 (FIG. 4), the method 80 (FIG. 5), the method 90 (FIGS. 6A and 6B), the method 110 (FIG. 8) and/or the method 130 (FIG. 9), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 12:
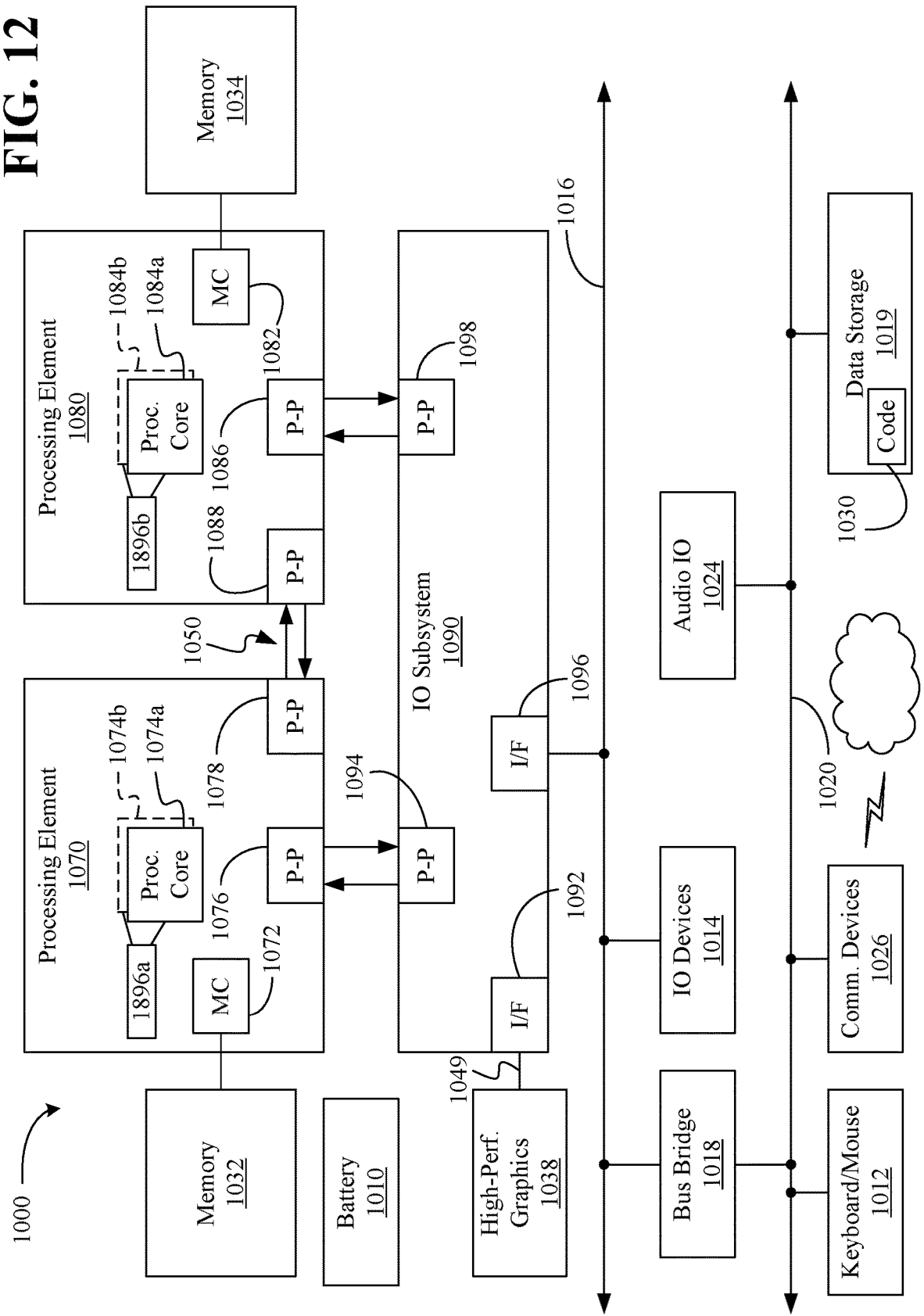
FIG. 12 is a block diagram of an example of a multi-processor based computing system according to an embodiment.

Referring now to FIG. 12, shown is a block diagram of a computing system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 11.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 12, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 3), the method 70 (FIG. 4), the method 80 (FIG. 5), the method 90 (FIGS. 6A and 6B), the method 110 (FIG. 8) and/or the method 130 (FIG. 9), already discussed, and may be similar to the code 213 (FIG. 11), already discussed. Further, an audio I/O 1024 may be coupled to second bus 1020 and a battery 1010 may supply power to the computing system 1000.

Note that other embodiments are contemplated. For example, instead of the point-to-point architecture of FIG. 12, a system may implement a multi-drop bus or another such communication topology. Also, the elements of FIG. 12 may alternatively be partitioned using more or fewer integrated chips than shown in FIG. 12.

ADDITIONAL NOTES AND EXAMPLES

Example 1 includes a performance-enhanced computing system comprising a memory expander including a coherent device memory, a memory controller coupled to the coherent device memory, and a plurality of host paths coupled to the memory controller, wherein the memory controller is to initialize the coherent device memory as hot-pluggable memory, a plurality of host devices coupled to the memory expander, the plurality of host devices including a first host device having a set of executable program instructions, which when executed by the first host device, cause the first host device to collect, by a basic input output system (BIOS), memory information from a first host path to the coherent device memory, transfer the memory information from the BIOS to an operating system (OS) via one or more OS interface tables, and initialize, by the OS, the memory expander based on the memory information, wherein the memory information includes memory capabilities and configuration settings associated with the memory expander.

Example 2 includes the computing system of Example 1, wherein the instructions, when executed, further cause the first host device to synchronize access to the coherent device memory with one or more additional host devices in the plurality of host devices.

Example 3 includes the computing system of Example 2, wherein access to the coherent device memory is synchronized via a token and one or more keep alive communications.

Example 4 includes the computing system of Example 1, wherein the memory expander is to report address mapping information to the plurality of host devices.

Example 5 includes the computing system of Example 1, wherein the plurality of host paths includes a first host path including a first port and a first coherence agent, and a second host path including a second port and a second coherence agent.

Example 6 includes the computing system of Example 5, wherein the first host path further includes a first set of registers and the second host path further includes a second set of registers, wherein the first set of registers and the second set of registers store memory capabilities and configuration settings associated with the memory expander.

Example 7 includes the computing system of any one of Examples 1 to 6, wherein the coherent device memory complies with a COMPUTE EXPRESS LINK standard.

Example 8 includes a memory expander comprising a coherent device memory, a memory controller coupled to the coherent device memory, and a plurality of host paths coupled to the memory controller, wherein the memory controller is to initialize the coherent device memory as hot-pluggable memory.

Example 9 includes the memory expander of Example 8, wherein the memory expander is to report address mapping information to a plurality of host devices.

Example 10 includes the memory expander of Example 9, wherein the plurality of host paths includes a first host path including a first port and a first coherence agent, and a second host path including a second port and a second coherence agent.

Example 11 includes the memory expander of Example 10, wherein the first host path further includes a first set of registers and the second host path further includes a second set of registers, wherein the first set of registers and the second set of registers store memory capabilities and configuration settings associated with the memory expander.

Example 12 includes the memory expander of any one of Examples 8 to 11, wherein the coherent device memory complies with a COMPUTE EXPRESS LINK standard.

Example 13 includes at least one computer readable storage medium comprising a set of executable program instructions, which when executed by a host device, cause the host device to collect, by a basic input output system (BIOS), memory information from a first host path to a coherent device memory on a memory expander, wherein the memory expander includes a plurality of host paths, transfer the memory information from the BIOS to an operating system (OS) via one or more OS interface tables, and initialize, by the OS, the memory expander based on the memory information, wherein the memory information includes memory capabilities and configuration settings associated with the memory expander.

Example 14 includes the at least one computer readable storage medium of Example 13, wherein the instructions, when executed, further cause the host device to synchronize access to the coherent device memory with one or more additional host devices.

Example 15 includes the at least one computer readable storage medium of Example 14, wherein access to the coherent device memory is synchronized via a token.

Example 16 includes the at least one computer readable storage medium of Example 14, wherein access to the coherent device memory is synchronized via one or more keep alive communications.

Example 17 includes the at least one computer readable storage medium of Example 14, wherein to synchronize access to the coherent device memory, the instructions, when executed, cause the host device to bypass a copy of data from the coherent device memory to the host device.

Example 18 includes the at least one computer readable storage medium of any one of Examples 13 to 17, wherein the coherent device memory is to be hot-pluggable memory that complies with a COMPUTE EXPRESS LINK standard.

Example 19 includes a method of operating a host device, the method comprising collecting, by a basic input output system (BIOS), memory information from a first host path to a coherent device memory on a memory expander, wherein the memory expander includes a plurality of host paths, transferring the memory information from the BIOS to an operating system (OS) via one or more OS interface tables, and initializing, by the OS, the memory expander based on the memory information, wherein the memory information includes memory capabilities and configuration settings associated with the memory expander.

Example 20 includes the method of Example 19, further including synchronizing access to the coherent device memory with one or more additional host devices.

Example 21 includes the method of Example 20, wherein access to the coherent device memory is synchronized via a token.

Example 22 includes the method of Example 20, wherein access to the coherent device memory is synchronized via one or more keep alive communications.

Example 23 includes the method of Example 20, wherein synchronizing access to the coherent device memory includes bypassing a copy of data from the coherent device memory to the host device.

Example 24 includes the method of any one of Examples 19 to 23, wherein the coherent device memory is hot-pluggable memory that complies with a COMPUTE EXPRESS LINK standard.

Example 25 includes an apparatus comprising means for performing the method of any one of Examples 19 to 24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
   a memory expander including a coherent device memory, a memory controller coupled to the coherent device memory, and a plurality of host paths coupled to the memory controller, wherein the memory controller is to initialize the coherent device memory as hot-pluggable memory;
   a plurality of host devices coupled to the memory expander, the plurality of host devices including a first host device having a set of executable program instructions, which when executed by the first host device, cause the first host device to:
      collect, by a basic input output system (BIOS), memory information from a first host path of the plurality of host paths to the coherent device memory,
      transfer the memory information from the BIOS to an operating system (OS) via one or more OS interface tables, and
      initialize, by the OS, the memory expander based on the memory information, wherein the memory information includes memory capabilities and configuration settings associated with the memory expander.

2. The computing system of claim 1, wherein the instructions, when executed, further cause the first host device to synchronize access to the coherent device memory with one or more additional host devices in the plurality of host devices.

3. The computing system of claim 2, wherein access to the coherent device memory is synchronized via a token and one or more keep alive communications.

4. The computing system of claim 1, wherein the memory expander is to report address mapping information to the plurality of host devices.

5. The computing system of claim 1, wherein the first host path includes a first port and a first coherence agent, and wherein the plurality of host paths further includes a second host path including a second port and a second coherence agent.

6. The computing system of claim 5, wherein the first host path further includes a first set of registers and the second host path further includes a second set of registers, wherein the first set of registers and the second set of registers store memory capabilities and configuration settings associated with the memory expander.

7. The computing system of claim 1, wherein the coherent device memory complies with a COMPUTE EXPRESS LINK standard.

8. A memory expander comprising:
   a coherent device memory;
   a memory controller coupled to the coherent device memory; and
   a plurality of host paths coupled to the memory controller, wherein the memory controller is to initialize the coherent device memory as hot-pluggable memory, and wherein the plurality of host paths includes:
      a first host path including a first port and a first coherence agent; and
      a second host path including a second port and a second coherence agent;
      wherein the memory expander is to report address mapping information to a plurality of host devices.

9. The memory expander of claim 8, wherein the first host path further includes a first set of registers and the second host path further includes a second set of registers, wherein the first set of registers and the second set of registers store memory capabilities and configuration settings associated with the memory expander.

10. The memory expander of claim 8, wherein the coherent device memory complies with a COMPUTE EXPRESS LINK standard.

11. The memory expander of claim 8, wherein the first coherence agent is to:
    receive a host request via the first host path;
    convert the host request into an internal memory request for the coherent device memory; and
    forward the internal memory request to the memory controller.

12. At least one non-transitory computer readable storage medium comprising a set of executable program instructions which, when executed by a host device, cause the host device to:
    collect, by a basic input output system (BIOS), memory information from a first host path to a coherent device memory on a memory expander, wherein the memory expander includes a plurality of host paths;
    transfer the memory information from the BIOS to an operating system (OS) via one or more OS interface tables; and
    initialize, by the OS, the memory expander based on the memory information, wherein the memory information includes memory capabilities and configuration settings associated with the memory expander.

13. The at least one non-transitory computer readable storage medium of claim 12, wherein the instructions, when executed, further cause the host device to synchronize access to the coherent device memory with one or more additional host devices.

14. The at least one non-transitory computer readable storage medium of claim 13, wherein access to the coherent device memory is synchronized via a token.

15. The at least one non-transitory computer readable storage medium of claim 13, wherein access to the coherent device memory is synchronized via one or more keep alive communications.

16. The at least one non-transitory computer readable storage medium of claim 13, wherein to synchronize access to the coherent device memory, the instructions, when executed, cause the host device to bypass a copy of data from the coherent device memory to the host device.

17. The at least one non-transitory computer readable storage medium of claim 12, wherein the coherent device memory is to be hot-pluggable memory that complies with a COMPUTE EXPRESS LINK standard.

18. A method comprising:
    collecting, by a basic input output system (BIOS), memory information from a first host path to a coherent device memory on a memory expander, wherein the memory expander includes a plurality of host paths;

transferring the memory information from the BIOS to an operating system (OS) via one or more OS interface tables; and initializing, by the OS, the memory expander based on the memory information, wherein the memory information includes memory capabilities and configuration settings associated with the memory expander.

19. The method of claim 18, further including synchronizing access to the coherent device memory with one or more additional host devices.

20. The method of claim 19, wherein access to the coherent device memory is synchronized via a token.

21. The method of claim 19, wherein access to the coherent device memory is synchronized via one or more keep alive communications.

22. The method of claim 19, wherein synchronizing access to the coherent device memory includes bypassing a copy of data from the coherent device memory to the host device.

23. The method of claim 18, wherein the coherent device memory is hot-pluggable memory that complies with a COMPUTE EXPRESS LINK standard.

* * * * *